(12) United States Patent
Furuya (10) Patent No.: US 9,153,839 B2
(45) Date of Patent: Oct. 6, 2015

(54) SOLID ELECTROLYTE BATTERY AND PROCESS FOR PRODUCING SOLID ELECTROLYTE BATTERY

(75) Inventor: Tatsuya Furuya, Kanagawa (JP)

(73) Assignee: Sony Corporation, Tokyo (JP)

( * ) Notice: Subject to any disclaimer, the term of this patent is extended or adjusted under 35 U.S.C. 154(b) by 583 days.

(21) Appl. No.: 13/203,941

(22) PCT Filed: Mar. 2, 2010

(86) PCT No.: PCT/JP2010/053718
§ 371 (c)(1),
(2), (4) Date: Aug. 30, 2011

(87) PCT Pub. No.: WO2010/104017
PCT Pub. Date: Sep. 16, 2010

(65) Prior Publication Data
US 2011/0318652 A1    Dec. 29, 2011

(30) Foreign Application Priority Data
Mar. 10, 2009  (JP) .................................. 2009-055895

(51) Int. Cl.
*H01M 10/0525* (2010.01)
*H01M 10/0562* (2010.01)
*H01M 10/0585* (2010.01)
(Continued)

(52) U.S. Cl.
CPC ............. *H01M 10/0525* (2013.01); *H01B 1/08* (2013.01); *H01M 6/185* (2013.01); *H01M 10/0562* (2013.01); *H01M 10/0585* (2013.01); *H01M 6/40* (2013.01); *H01M 2300/0068* (2013.01); *Y02E 60/122* (2013.01)

(58) Field of Classification Search
CPC .................... H01M 10/0525; H01M 10/0562; H01M 10/0585; H01M 6/40; H01M 6/185; H01M 2300/0068; H01B 1/08; Y02E 60/122
USPC .......................... 429/322, 122, 188, 304, 321
See application file for complete search history.

(56) References Cited

U.S. PATENT DOCUMENTS 5,273,846 A  * 12/1993  Plichta et al. ................. 429/320
5,278,004 A  *  1/1994  Plichta et al. ................. 429/322
(Continued)

FOREIGN PATENT DOCUMENTS

JP         58167431    * 10/1983  ............. C01G 31/00
JP         S58-167431  * 10/1983  ............. C01G 31/00
(Continued)

OTHER PUBLICATIONS

Song et al., "Synthesis of Li3VO4 by the citrate sol-gel method and its ionic conductivity", Journal of Material Processing Technology, 2002, pp. 21-25, vol. 120.

*Primary Examiner* — Patrick Ryan
*Assistant Examiner* — Aaron Greso
(74) *Attorney, Agent, or Firm* — Sony Corporation (57) ABSTRACT

A solid electrolyte battery using a solid electrolyte capable of realizing high conductivity, and a process for producing a solid electrolyte battery are provided. The solid electrolyte battery is structured as a laminate of a positive electrode collector layer, a positive electrode active material layer, a solid electrolyte layer, a negative electrode active material layer, and a negative electrode collector layer formed in order on a substrate. The solid electrolyte layer is a thin film formed of a compound of the formula $Li_3MO_4$ (M =V, Nb, Ta, or Db).

4 Claims, 4 Drawing Sheets

- 16 NEGATIVE ELECTRODE COLLECTOR LAYER
- 15 NEGATIVE ELECTRODE ACTIVE MATERIAL LAYER
- 14 SOLID ELECTROLYTE LAYER
- 13 POSITIVE ELECTRODE ACTIVE MATERIAL LAYER
- 12 POSITIVE ELECTRODE COLLECTOR LAYER
- 11 SUBSTRATE (51) Int. Cl.
*H01M 6/18* (2006.01)
*H01M 6/40* (2006.01)
*H01B 1/08* (2006.01)

(56) References Cited

U.S. PATENT DOCUMENTS

| | | | |
|---|---|---|---|
| 5,512,147 A * | 4/1996 | Bates et al. | 204/192.15 |
| 2004/0023106 A1* | 2/2004 | Benson et al. | 429/122 |
| 2004/0048157 A1* | 3/2004 | Neudecker et al. | 429/231.2 |
| 2004/0096745 A1 | 5/2004 | Shibano et al. | |
| 2004/0106045 A1* | 6/2004 | Ugaji et al. | 429/321 |
| 2006/0216611 A1* | 9/2006 | Ugaji et al. | 429/322 |
| 2009/0029264 A1 | 1/2009 | Nakazawa et al. | |

FOREIGN PATENT DOCUMENTS

| | | | | |
|---|---|---|---|---|
| JP | H04-315775 | * | 11/1992 | H01M 4/02 |
| JP | 3244291 | * | 1/2002 | H01M 4/02 |
| JP | 2004-179158 | | 6/2004 | |
| WO | 2006/082846 | | 8/2006 | |

* cited by examiner

SOLID ELECTROLYTE BATTERY AND PROCESS FOR PRODUCING SOLID ELECTROLYTE BATTERY

CROSS REFERENCE TO RELATED APPLICATIONS

The present application is a National Stage of International Application No. PCT/JP2010/053718 filed on Mar. 2, 2010, which claims priority to Japanese Patent Application No. 2009-055895, filed in the Japanese Patent Office on Mar. 10, 2009, the entire contents of which are being incorporated herein by reference.

BACKGROUND

This invention relates to solid electrolyte batteries and processes for producing solid electrolyte batteries. More specifically, the invention relates to solid electrolyte batteries that include a thin film-shaped all-solid electrolyte formed between a positive electrode and a negative electrode, and processes for producing such solid electrolyte batteries.

The recent rapid development of portable electronics has made portable electronic devices such as cellular phones and laptop personal computers to be recognized as the fundamental technology representing the basis of the sophisticated information society.

Further, the active research and development directed to improving the functions of these devices has lead to a proportional increase in the power consumption of the portable electronic devices. Because these electronic devices are also required to run long hours, the secondary battery, a driving power supply, is expected to have higher energy density.

Considering factors such as the occupied volume and the weight of the battery installed in portable electronic devices, the battery energy density should desirably be as high as possible. Lithium ion secondary batteries using doping and undoping of lithium ions have excellent energy density, and have been widely used in portable electronic devices.

For safety and reliability issues, the research and development of lithium ion secondary batteries are particularly active in all-solid lithium ion secondary batteries in which a solid electrolyte containing no organic electrolytic solution is used as the electrolyte. The characteristics of the solid electrolyte are very important in all-solid lithium ion secondary batteries. Accordingly, there have been active studies of inorganic solid electrolytes such as $Li_3PO_4$, and $Li_3VO_4$.

For example, X. Son et al., *Journal of Materials Processing Technology* 120 (2002) 21-25 describes a sintered body obtained by sintering a $Li_3VO_4$ powder. The conductivity of this sintered body is reported to be $10^{-8}$ S/cm to $10^{-9}$ S/cm at room temperature.

SUMMARY

For desirable battery performance, the conductivity of the solid electrolyte needs to be improved in batteries using the solid electrolyte. Taking the $Li_3VO_4$ sintered body described in X. Son et al., *Journal of Materials Processing Technology* 120 (2002) 21-25, battery performance can be improved if the conductivity of the $Li_3VO_4$ sintered body, reported as being about $10^{-8}$ S/cm to $10^{-9}$ S/cm at room temperature, could be made higher. Further, in order for batteries to be usable over a wide temperature range, it is important that the solid electrolyte maintain high conductivity over a wide temperature range.

Accordingly, it is an object of this invention to provide a solid electrolyte battery that uses a highly conductive solid electrolyte, and a process for producing such solid electrolyte batteries.

It is another object of the invention to provide a solid electrolyte battery that can have stable battery performance over a wide temperature range, and a process for producing such solid electrolyte batteries.

Means for Solving the Problems

In order to solve the foregoing problems, the first invention is a solid electrolyte battery that includes:

a positive electrode layer and a negative electrode layer; and a solid electrolyte layer provided between the positive electrode layer and the negative electrode layer, the solid electrolyte layer being a thin film formed of a compound of the formula $Li_3MO_4$ (M=V, Nb, Ta, or Db), and the thin film being at least partially an amorphous phase.

The second invention is a solid electrolyte battery that includes:

a positive electrode layer and a negative electrode layer; and a solid electrolyte layer provided between the positive electrode layer and the negative electrode layer, the solid electrolyte layer being a nitrogen-containing thin film that includes nitrogen added to a compound of the formula $Li_3MO_4$ (M=V, Nb, Ta, or Db), and the nitrogen-containing thin film being at least partially an amorphous phase.

The third invention is a process for producing a solid electrolyte battery that includes a positive electrode layer, a negative electrode layer, and a solid electrolyte layer provided between the positive electrode layer and the negative electrode layer, the process including a solid electrolyte layer forming step of forming a thin film of an at least partially amorphous phase from a thin film raw material for which a compound of the formula $Li_3MO_4$ (M=V, Nb, Ta, or Db) is used.

According to the first to third inventions, solid electrolytes can be obtained that realize high conductivity. According to the second invention, because the nitrogen-containing thin film has small activation energy, stable battery performance can be obtained over a wide temperature range.

Advantage of the Invention

The invention can provide a solid electrolyte battery that uses a highly conductive solid electrolyte. The invention also can provide stable battery performance over a wide temperature range.

Additional features and advantages of the present invention are described herein, and will be apparent from, the following Detailed Description and the Figures.

DETAILED DESCRIPTION

Embodiments of the invention are described below with reference to the accompanying drawings. Note that the embodiments described below are specific examples of the invention, and are described with various technically preferred limitations. The following embodiments, however, do not restrict the scope of the invention, unless otherwise specified. Descriptions are given in the following order.

1. First Embodiment (first example of solid electrolyte battery)
2. Second Embodiment (second example of solid electrolyte battery)
3. Third Embodiment (solid electrolyte battery producing process)
4. Other Embodiments (variations)
1. First Embodiment (First Example of solid Electrolyte Battery)

[Configuration of Solid Electrolyte Battery]

Figure 1:
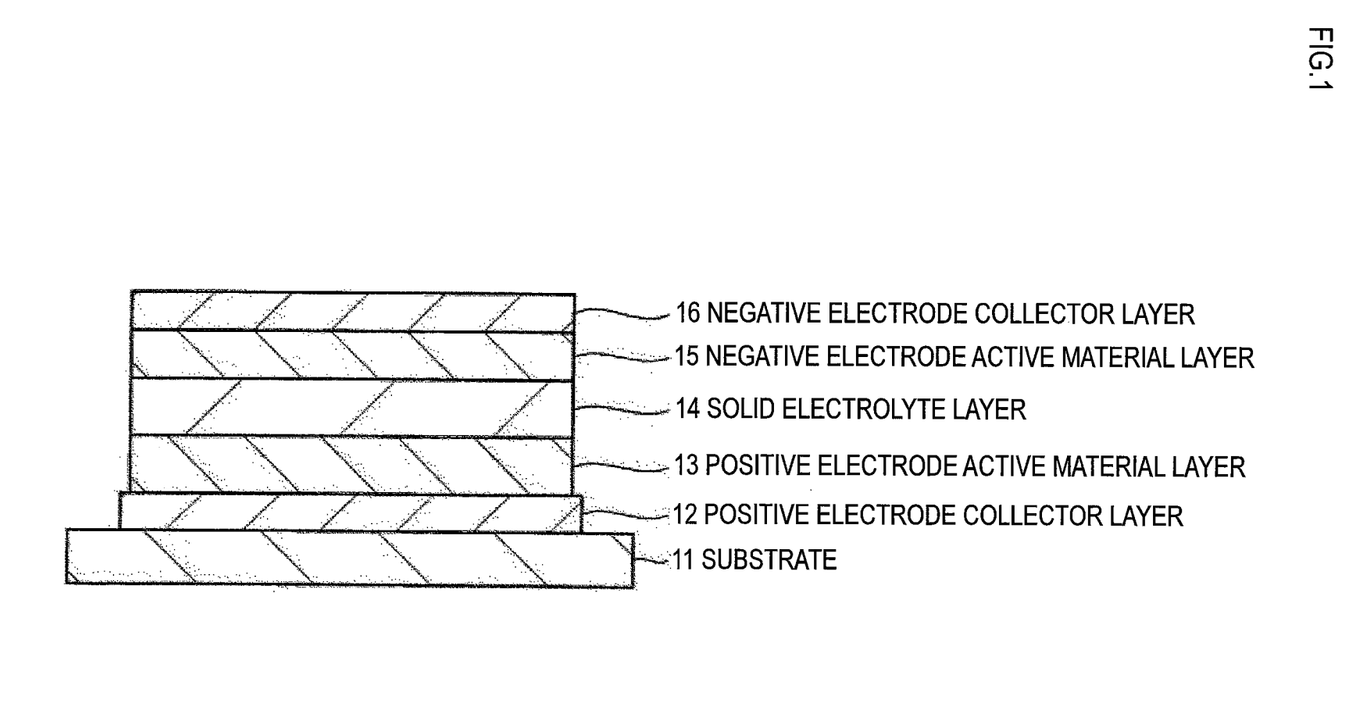
FIG. 1 is a cross sectional view representing a structure of solid electrolyte batteries according to First and Second Embodiments of the invention.

An embodiment of the invention is described below with reference to the accompanying drawings. FIG. 1 represents a cross sectional structure of a solid electrolyte battery according to First Embodiment of this invention. The solid electrolyte battery is a thin-film solid electrolyte battery in which the constituting materials of the positive electrode, the negative electrode, and the solid electrolyte in the battery are formed as a laminate of thin films. The solid electrolyte battery is, for example, a lithium ion secondary battery, which, upon charging, releases lithium from the positive electrode, and stores the lithium in the negative electrode via the solid electrolyte. Upon discharge, the lithium is released from the negative electrode, and stored in the positive electrode via the solid electrolyte.

The solid electrolyte battery is structured as a laminate of a positive electrode collector layer 12, a positive electrode active material layer 13, a solid electrolyte layer 14, a negative electrode active material layer 15, and a negative electrode collector layer 16 formed in order on a substrate 11. Note that the positive electrode collector layer 12 and the positive electrode active material layer 13 form the positive electrode, and that the negative electrode active material layer 15 and the negative electrode collector layer 16 form the negative electrode.

(Substrate 11)

The substrate 11 may be, for example, a substrate of electrically insulating material such as glass, alumina, and resin; a substrate of semiconductor material such as silicon; or a substrate of conductive material such as aluminum, copper, and stainless steel. The shape of the substrate 11 is not particularly limited, and the substrate 11 may have a form of, for example, a plate, a sheet, a film, or a block. The substrate 11 may be hard or flexible, and a wide range of materials can be used therefor.

(Positive Electrode Collector Layer 12)

The positive electrode collector layer 12 is a thin film formed of positive electrode collector material that has desirable chemical stability and electrical conductivity. Note that, "thin film" refers to materials that have a thickness of, for example, no greater than several micrometers, and have a considerably smaller volume relative to surface area. Examples of positive electrode collector material include metallic material such as aluminum, nickel, stainless steel, copper, ITO (Indium Tin Oxide), platinum, gold, and silver.

(Positive Electrode Active Material Layer 13)

The positive electrode active material layer 13 is a thin film formed of positive electrode active material that can store and release lithium. For example, lithium transition metal composite oxides used for common lithium ion secondary batteries are used as such positive electrode active material that can store and release lithium. Specific examples include lithium-manganese composite oxides of a spinel structure such as $LiMn_2O_4$; lithium composite oxides of a laminar structure such as $LiCoO_2$, $LiNiO_2$, and $Li_xNi_yCo_{1-y}O_2$ (x and y vary depending on the charge and discharge state of the battery; generally $0<x<1.00$, and $0<y<1.00$); and lithium phosphate compounds of an olivine structure such as $LiFePO_4$. Solid solutions with some of the transition metal elements replaced with other elements also may be used.

When using a lithium composite oxide of a laminar structure, it is preferable that the layer of lithium composite oxide grains be oriented perpendicular to the plane of the positive electrode collector layer 13. In this way, the lithium released from the negative electrode upon discharge is inserted between the layers of the lithium composite oxide, and, because the lithium becomes easily movable, the resistance of the positive electrode active material layer 13 can be lowered.

Other examples of positive electrode active material include lithium-free metal sulfides and metal oxides such as $TiS_2$, $MoS_2$, $NbSe_2$, and $V_2O_5$, and specific polymers such as polyaniline and polythiophene. Any of the foregoing materials, including the lithium composite oxides, metal sulfides, and metal oxides, may be used as the positive electrode material either alone or as a mixture.

(Solid Electrolyte Layer 14)

The solid electrolyte layer 14 is a thin film formed of a compound of the formula $Li_3MO_4$ [M=V (vanadium), Nb (niobium), Ta (tantalum), or Db (dubnium)]. The thin film is an inorganic solid electrolyte with lithium ion conductivity. Further, the thin film is also an all-solid electrolyte. By all-solid electrolyte, it means a solid electrolyte containing no organic electrolytic solution.

The thin film at least partially has an amorphous phase. For example, the thin film may be an amorphous single phase, or a mixture of an amorphous phase and a crystalline phase. Preferably, the thin film is an amorphous single phase, because it can realize higher conductivity.

The thin film can be formed by sputtering, using, for example, a sintered body of a powder compound of the formula $Li_3MO_4$ (M=V, Nb, Ta, or Db) as the target. The thin film has far more improved conductivity than, for example, in the state of a thin film raw material such as in the sintered body, and can thus realize high conductivity.

Taking the compound of the formula $Li_3VO_4$ (M=V in $Li_3MO_4$) as an example, conductivity can be greatly improved, as described below.

The conventional sintered body obtained by sintering a lithium vanadate ($Li_3VO_4$) powder is reported to have a conductivity of about $10^{-8}$ S/cm to $10^{-9}$ S/cm at room temperature (see X. Son et al., *Journal of Materials Processing Technology* 120 (2002)21-25; the Background Art section).

In contrast, the thin film formed from a compound of the formula $Li_3VO_4$ by sputtering using this sintered body as the target has a conductivity of about $10^{-6}$ S/cm to $10^{-7}$ S/cm at room temperature. Thus, the thin film formed from a compound of the formula $Li_3VO_4$ can have conductivity higher than that of the lithium vanadate sintered body by a factor of about 10 to 100.

(Negative Electrode Active Material Layer 15)

The negative electrode active material layer 15 is a thin film of negative electrode active material for which a negative electrode material capable of storing and releasing lithium is used. Examples of the negative electrode material capable of storing and releasing lithium include carbon materials capable of storing and releasing lithium, composite materials of metallic material and carbon material, and materials that can form an alloy with lithium. Specific examples of carbon materials capable of storing and releasing lithium include graphite, non-graphitizable carbon, and easily graphitizable carbon. More specific examples of the carbon materials include pyrolyzed carbons, cokes (pitch cokes, needle cokes, petroleum cokes), graphites, glass-like carbons, organic polymer compound calcined products (carbonized products obtained by calcining phenol resin, furan resin, or the like at appropriate temperatures), carbon fibers, and activated carbon.

For example, when using material such as graphite, it is preferable that the layer of graphite be oriented perpendicular to the solid electrolyte layer 14. In this way, lithium is stored between the layers of graphite while charging the battery, and, because the lithium becomes easily movable, the resistance of the positive electrode active material layer 13 can be lowered.

A variety of metallic elements and semi-metallic elements can be used as the material that can form an alloy with lithium. These materials may be used either alone or in the form of alloys or compounds. Further, materials that at least partially have one or more phases can be used. In this invention, the alloys encompass both alloys of two or more metallic elements, and alloys of one or more metallic elements and one or more semi-metallic elements. Further, the alloys may include non-metallic elements. The composition may be a solid solution, a eutectic (eutectic mixture), or an intermetallic compound, or a mixture of two or more of these.

Specific examples of such metallic elements and semi-metallic elements include magnesium (Mg), boron (B), aluminum (Al), gallium (Ga), indium (In), silicon, germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt).

Materials containing the metallic elements and semi-metallic elements that belong to Group 14 of the periodic table (long form) are preferable, and those containing at least one of silicon and tin are particularly preferable. This is because silicon and tin are highly capable of storing and releasing lithium, and can thus provide high energy density. Specific examples of such materials include those containing silicon or tin, either alone or as an alloy or a compound, and those at least partially containing one or more phases of these.

Alloys containing tin (Sn), cobalt (Co), and carbon (C) also can be used.

Further, polymers such as polyacetylene and polypyrrole, and oxides such as $SnO_2$ may be used as the material capable of storing and releasing lithium. In the negative electrode active material layer 15, any of the foregoing negative electrode materials may be used as the negative electrode active material, either alone or as a mixture.

(Negative Electrode Collector Layer 16)

The negative electrode collector layer 16 is a thin film formed of negative electrode collector material that has desirable chemical stability and electrical conductivity. Examples of the negative electrode collector material include metallic materials such as aluminum, nickel, stainless steel, copper, ITO, platinum, gold, and silver. The material of the negative electrode collector layer 16 may be other than these, provided that it is electrically conductive, and does not react with the negative electrode active material layer 15.

[Effects]

In the solid electrolyte battery according to First Embodiment of the invention, the solid electrolyte layer 14 is configured as a thin film that is at least partially an amorphous phase, and is formed of a compound of the formula $Li_3MO_4$ (M=V, Nb, Ta, or Db). Configured this way, the solid electrolyte layer 14 can realize high conductivity, and a solid electrolyte battery with a small internal resistance can be provided.

2. Second Embodiment (Second Example of Solid Electrolyte Battery)

[Configuration of Solid Electrolyte Battery]

A solid electrolyte battery according to Second Embodiment is described below. The solid electrolyte battery according to Second Embodiment has the same structure described in First Embodiment. Specifically, as illustrated in FIG. 1, the solid electrolyte battery is structured to include a positive electrode collector layer 12, a positive electrode active material layer 13, a solid electrolyte layer 14, a negative electrode active material layer 15, and a negative electrode collector layer 16 laminated in order on a substrate 11.

The solid electrolyte battery according to Second Embodiment has the same configuration as the solid electrolyte battery of First Embodiment, except for the configuration of the solid electrolyte layer 14. Accordingly, the following descriptions specifically deal with the configuration of the solid electrolyte layer 14, and the configurations of other elements, such as the positive electrode collector layer 12, will not be described in detail, because these elements are essentially the same as in First Embodiment.

(Solid Electrolyte Layer in Solid Electrolyte Battery of Second Embodiment)

The solid electrolytic layer 14 in the solid electrolyte battery of Second Embodiment is a nitrogen-containing thin film formed by adding nitrogen to a compound of the formula $Li_3MO_4$ (M=V, Nb, Ta, or Db). The nitrogen-containing thin film can be formed by sputtering in a nitrogen-containing atmosphere (for example, an atmosphere containing argon and nitrogen), using, for example, a sintered body of a powder compound of the formula $Li_3MO_4$ (M=V, Nb, Ta, or Db) as the target.

The nitrogen-containing thin film at least partially has an amorphous phase. For example, the nitrogen-containing thin film may be an amorphous single phase, or a mixture of an amorphous phase and a crystalline phase. Preferably, the nitrogen-containing thin film is an amorphous single phase, because it can realize higher conductivity.

[Effects]

In the solid electrolyte battery according to Second Embodiment of the invention, the solid electrolyte layer 14 is configured as a thin film formed by adding nitrogen to a compound of the formula $Li_3MO_4$ (M=V, Nb, Ta, or Db). Configured this way, the solid electrolyte layer 14 can realize high conductivity, and a solid electrolyte battery with a small internal resistance can be obtained.

Further, in the solid electrolyte battery according to Second Embodiment of the invention, the solid electrolyte layer 14 has small activation energy, and a solid electrolyte battery can be obtained that has stable performance over a wide temperature range from low temperature to high temperature (for example, at least −30° C. to 80° C.).

3. Third Embodiment (Solid Electrolyte Battery Producing Process)

[Solid Electrolyte Battery Producing Process]

The following describes a process for producing the solid electrolyte batteries of First and Seconds Embodiments of the invention shown in FIG. 1.

First, a thin film that becomes the positive electrode collector layer 12 is formed on the substrate 11, and a thin film that becomes the positive electrode active material layer 13 is formed on the positive electrode collector layer 12. A thin film that becomes the solid electrolyte layer 14 is then formed on the positive electrode active material layer 13. Thereafter, a thin film that becomes the negative electrode active material layer 15 is formed on the solid electrolyte layer 14, and a thin film that becomes the negative electrode collector layer 16 is formed on the negative electrode active material layer 15. The solid electrolyte batteries of First and Second Embodiments of the invention can be produced in a series of these steps.

[Method of Forming Thin Films]

The method of forming the thin films for the positive electrode collector layer 12, the positive electrode active material layer 13, the solid electrolyte layer 14, the negative electrode active material layer 15, and the negative electrode collector layer 16 is described below.

Each thin film can be formed using vapor-phase methods, for example, such as PVD (Physical Vapor Deposition) and CVD (Chemical Vapor Deposition). The thin films also can be formed using liquid-phase methods such as electroplating, nonelectrolytic plating, coating, and a sol-gel method. Solid-phase methods such as an SPE (solid phase epitaxy) method, and an LB (Langmuir-Blodgett) method also can be used.

The PVD method is a method that forms a thin film on a substrate by first evaporating and vaporizing a thin film raw material by the energy of, for example, heat or plasma. Examples of the PVD method include vacuum vapor deposition, sputtering, ion plating, an MBE (molecular beam epitaxy) method, and a laser abrasion method.

The CVD method is a method that deposits a thin film by the absorption, reaction, and elimination that take place on a substrate surface after the decomposition, reaction and formation of an intermediate product from the raw material turned into gas molecules by the energy of, for example, heat, light, or plasma applied to the thin film material supplied as a gas.

Examples of the CVD method include thermal CVD, MOCVD (Metal Organic Chemical Vapor Deposition), RF plasma CVD, light CVD, laser CVD, and an LPE (Liquid Phase Epitaxy) method.

The formation of the thin films for the positive electrode active material layer 13, the solid electrolyte layer 14, the negative electrode active material layer 15, and the negative electrode collector layer 16 of desired configurations using the foregoing thin film forming methods would be easy for a skilled artisan. Specifically, a skilled artisan would be able to easily form the thin films for the positive electrode active material layer 13, the solid electrolyte layer 14, the negative electrode active material layer 15, and the negative electrode collector layer 16 of desired configurations by appropriately selecting, for example, thin film raw materials, thin film forming methods, and thin film forming conditions.

[Fabrication Example of Solid Electrolyte Battery]

The following specifically describes a fabrication example of the solid electrolyte batteries of First and Second Embodiments using sputtering as the method of forming the thin films for the positive electrode active material layer 13, the solid electrolyte layer 14, the negative electrode active material layer 15, and the negative electrode collector layer 16.

Note that the method used to form the thin films for the positive electrode active material layer 13, the solid electrolyte layer 14, the negative electrode active material layer 15, and the negative electrode collector layer 16 is not limited to sputtering, and the various thin film forming methods mentioned above also can be used. The thin film for the solid electrolyte layer 14 is formed as a thin film that at least partially has an amorphous phase. The thin film may be an amorphous single phase, or a mixture of an amorphous phase and a crystalline phase. Preferably, the thin film is an amorphous single phase, because it can realize higher conductivity.

[Sputtering Apparatus]

An example of an RF (radio-frequency) magnetron sputtering apparatus used for the production of the solid electrolyte battery is described below. Note that the configuration of the sputtering apparatus is merely an example, and the sputtering apparatus used for the production of the solid electrolyte battery is not limited to the configuration described below.

Figure 2:
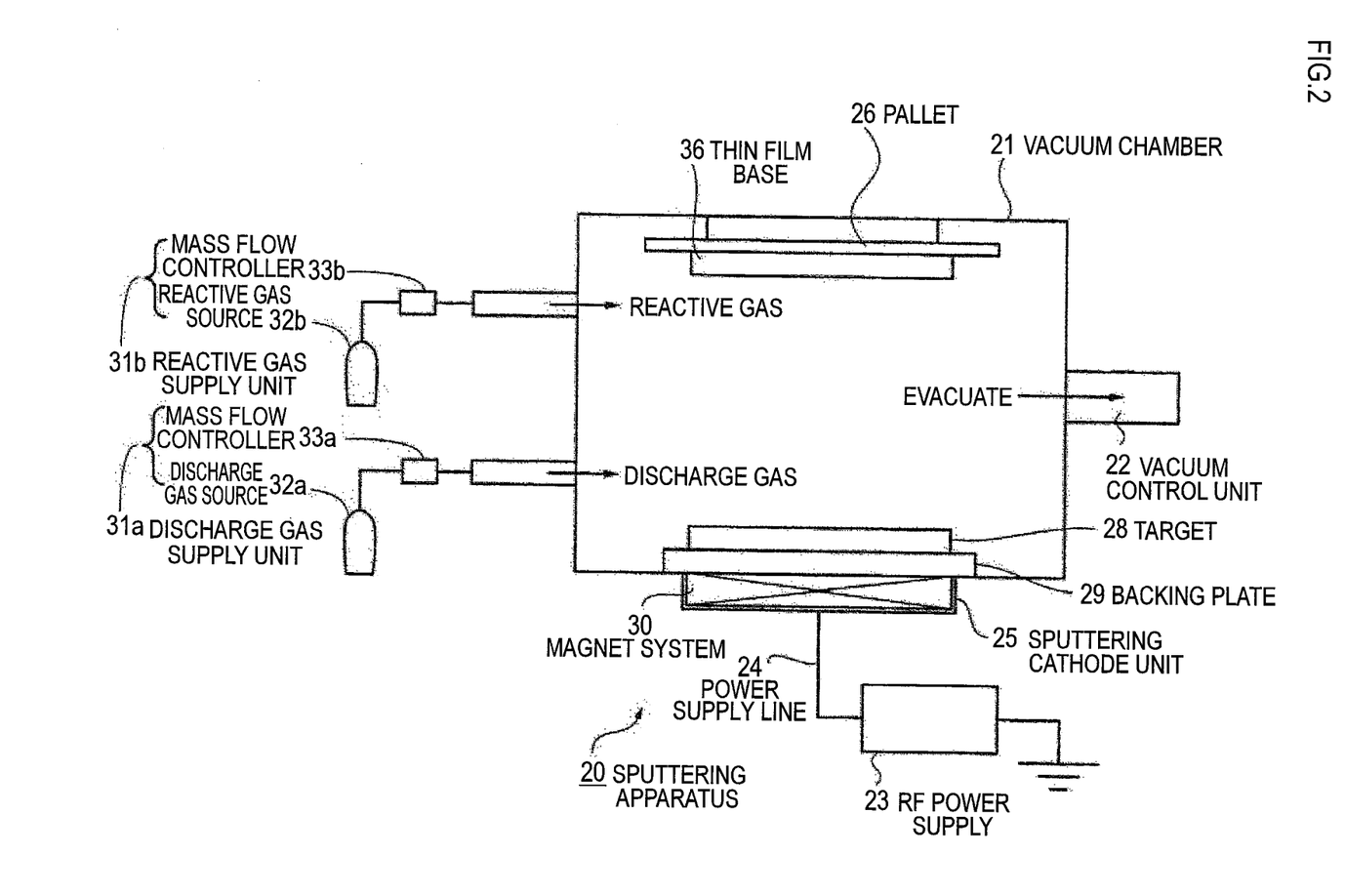
FIG. 2 is a schematic diagram representing an exemplary configuration of a sputtering apparatus used for a solid electrolyte battery producing process according to Third Embodiment of the invention.

As illustrated in FIG. 2, a sputtering apparatus 20 includes a vacuum chamber (deposition chamber) 21, a vacuum control unit 22 that controls the vacuum state inside the vacuum chamber 21, and an RF power supply 23 for plasma discharge. The sputtering apparatus 20 also includes a sputtering cathode unit 25 connected to the RF power supply 23 via a power supply line 24, and a pallet 26 disposed opposite from the sputtering cathode unit 25 with a predetermined distance in between. The sputtering apparatus 20 also includes a discharge gas supply unit 31a that supplies inert gas such as argon gas into the vacuum chamber 21, and a reactive gas supply unit 31b that supplies reactive gas such as nitrogen gas and oxygen gas into the vacuum chamber 21.

The discharge gas supply unit 31a is configured from a discharge gas source 32a that stores discharge gas for which inert gas such as argon gas is used, and a mass flow controller 33a that controls the gas flow rate of the discharge gas supplied to the vacuum chamber 21. The discharge gas is supplied to the vacuum chamber 21 from the discharge gas source 32a via the mass flow controller 33a.

The reactive gas supply unit 31b is configured from a reactive gas source 32b that stores reactive gas such as nitrogen gas and oxygen gas, and a mass flow controller 33b that controls the gas flow rate of the reactive gas supplied to the vacuum chamber 21. The reactive gas is supplied to the vacuum chamber 21 from the reactive gas source 32b via the mass flow controller 33b.

The sputtering cathode unit 25 includes a target 28 that serves as the negative electrode, a backing plate 29 configured to anchor the target 28, and a magnet system 30 provided on the surface of the backing plate 29 opposite from the target 28.

The pallet 26 serving as the positive electrode, and the target 28 serving as the negative electrode represent an electrode pair. A thin film base 36, on which the thin film is formed, is attached onto the pallet 26, opposite from the sputtering cathode unit 25.

The sputtering apparatus 20 used to form the thin films is configured this way. The following describes how the sputtering apparatus 20 is used to fabricate the solid electrolyte battery of First Embodiment (first example), and the solid electrolyte battery of Second Embodiment (second example).

[Fabrication of Solid Electrolyte Battery with Sputtering Apparatus 20 (First Example)]

(Formation of Positive Electrode Collector Layer)

First, the substrate 11 is placed in the sputtering apparatus 20 and anchored on the pallet 26. The target 28 formed of the material that becomes the positive electrode collector layer 12 has been pre-installed in the sputtering apparatus 20. Then, the vacuum chamber 21 is vacuumed to create a predetermined pressure, and an inert gas, for example, such as argon gas is introduced into the vacuum chamber 21 from the discharge gas supply unit 31a. A thin film that becomes the positive electrode collector layer 12 is then formed on the substrate 11 by sputtering.

(Formation of Positive Electrode Active Material Layer)

After forming the positive electrode collector layer 12, the substrate 11 is placed in the sputtering apparatus 20 and anchored on the pallet 26. The target 28 formed of the material that becomes the positive electrode active material layer 13 has been pre-installed in the sputtering apparatus 20. Then, the vacuum chamber 21 is vacuumed to create a predetermined pressure, and an inert gas, for example, such as argon gas is introduced into the vacuum chamber 21 from the discharge gas supply unit 31a. A thin film that becomes the positive electrode active material layer 13 is then formed by sputtering on the positive electrode collector layer 12 formed in the previous step.

(Formation of Solid Electrolyte Layer)

After forming the positive electrode active material layer 13, the substrate 11 is placed in the sputtering apparatus 20 and anchored on the pallet 26. The target 28 pre-installed in the sputtering apparatus 20 is configured from a sintered body obtained by sintering a powder compound of the formula $Li_3MO_4$ (M=V, Nb, Ta, or Db).

The vacuum chamber 21 is then vacuumed to create a predetermined pressure, and inert gas, for example, such as argon gas is introduced into the vacuum chamber 21 from the discharge gas supply unit 31a. A thin film that becomes the solid electrolyte layer 14 is then formed by sputtering on the positive electrode active material layer 13 formed in the previous step.

(Formation of Negative Electrode Active Material Layer)

After forming the solid electrolyte layer 14, the substrate 11 is placed in the sputtering apparatus 20 and anchored on the pallet 26. The target 28 formed of the material that becomes the negative electrode active material layer 15 has been pre-installed in the sputtering apparatus 20. The vacuum chamber 21 is then vacuumed to create a predetermined pressure, and inert gas, for example, such as argon gas is introduced into the vacuum chamber 21. A thin film that becomes the negative electrode active material layer 15 is then formed by sputtering on the solid electrolyte layer 14 formed in the previous step.

(Formation of Negative Electrode Collector Layer)

After forming the negative electrode active material layer 15, the substrate 11 is placed in the sputtering apparatus 20 and anchored on the pallet 26. The target 28 formed of the material that becomes the negative electrode collector layer 16 has been pre-installed in the sputtering apparatus 20. The vacuum chamber 21 is then vacuumed to create a predetermined pressure, and inert gas, for example, such as argon gas is introduced into the vacuum chamber 21. A thin film that becomes the negative electrode collector layer 16 is then formed by sputtering on the negative electrode active material layer 15 formed in the previous step. This completes the solid electrolyte battery according to First Embodiment of the invention.

[Fabrication of Solid Electrolyte Battery with Sputtering Apparatus 20 (Second Example)]

(Formation of Positive Electrode Collector Layer, and formation of Positive Electrode Active Material Layer)

The positive electrode collector layer 12 and the positive electrode active material layer 13 are formed in order on the substrate 11 in the steps described in the first example.

(Formation of Solid Electrolyte Layer)

After forming the positive electrode active material layer 13, the substrate 11 is placed in the sputtering apparatus 20 and anchored on the pallet 26. The target 28 pre-installed in the sputtering apparatus 20 is configured as a sintered body obtained by sintering a powder compound of the formula $Li_3MO_4$ (M=V, Nb, Ta, or Db).

The vacuum chamber 21 is then vacuumed to create a predetermined pressure, and inert gas, for example, such as argon gas is introduced into the vacuum chamber 21 from the discharge gas supply unit 31a, followed by introduction of reactive gas from the reactive gas supply unit 31b. A thin film that becomes the solid electrolyte layer 14 is then formed by sputtering on the positive electrode active material layer 13 formed in the previous step.

The reactive gas used is, for example, nitrogen gas, or a mixture of nitrogen gas and oxygen gas. With the nitrogen gas or a mixture of nitrogen gas and oxygen gas used as the reactive gas, nitrogen can be introduced to the thin film, and the activation energy of the thin film can be lowered. The use of a nitrogen and oxygen gas mixture is preferred, because it can further improve the conductivity of the resulting thin film.

In the second example, the thin film that becomes the solid electrolyte layer 14 is formed by reactive sputtering. Reactive sputtering is a method in which reactive gas such as nitrogen and oxygen is introduced into the vacuum chamber 21 for sputtering, in addition to the inert gas for which discharge gas such as argon gas is used.

(Formation of Negative Electrode Active Material Layer, and Formation of Negative Electrode Collector Layer)

Thin films that become the negative electrode active material layer 15 and the negative electrode collector layer 16 are then formed in order on the solid electrolyte layer 14 in the manner described in the first example. This completes the solid electrolyte battery according to Second Embodiment.

[Effects]

According to Third Embodiment of the invention, the solid electrolyte layer 14 is formed in the step that forms a thin film of an at least partially amorphous phase from the thin film raw material for which a compound of the formula $Li_3MO_4$ (M=V, Nb, Ta, or Db) is used. In this way, the conductivity of the thin film raw material can be greatly improved, and the solid electrolyte layer 14 can have high conductivity.

For example, a thin film of an at least partially amorphous phase is formed by sputtering, using the raw material $Li_3VO_4$ sintered body reported to have a conductivity of about $10^{-8}$ S/cm to $10^{-9}$ S/cm at room temperature. In this way, the conductivity can be increased by a factor of about 10 to 100. This makes it possible to obtain a solid electrolyte battery of small internal resistance.

Further, the activation energy of the thin film formed as the solid electrolyte layer 14 can be reduced by forming the thin film in a nitrogen-containing atmosphere. It is therefore possible to obtain a solid electrolyte battery that has stable performance over a wide temperature range from low temperature to high temperature.

EXAMPLES

The following tests were performed to ascertain the effects of the present application. Specifically, a solid electrolyte film was formed using a lithium vanadate ($Li_3VO_4$) sintered body as the thin film raw material (sputtering target), and the conductivity of the film was measured.

Test Example 1

[Fabrication of Measurement Cell]

Figure 3:
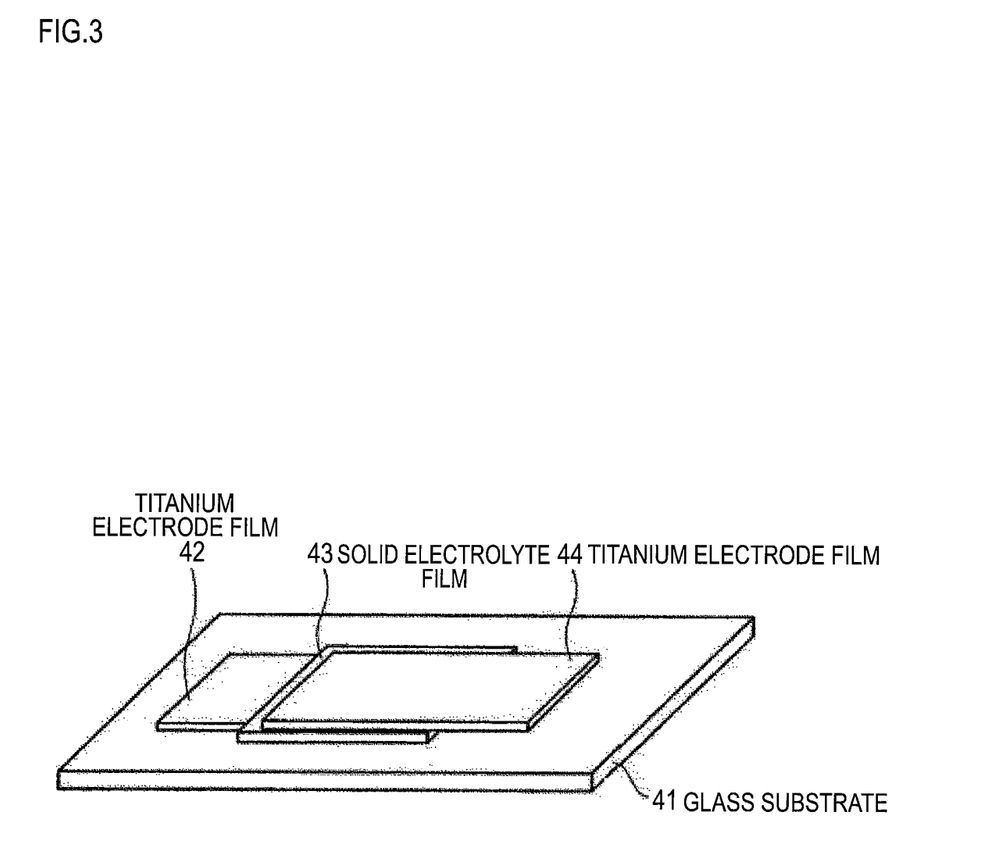
FIG. 3 is a schematic diagram explaining a measurement method used in Test Examples.

First, a measurement cell of the configuration glass substrate 41/titanium electrode film 42/solid electrolyte film 43/titanium electrode film 44 shown in FIG. 3 was fabricated in the manner described below. Note that the titanium electrode film 42, the solid electrolyte film 43, and the titanium electrode film 44 were formed using an RF magnetron sputtering apparatus.

(Fabrication of Titanium Electrode Film 42)

The titanium electrode film 42 of titanium was formed as the lower electrode on the glass substrate 41 under the following sputtering conditions, using a titanium metallic material as the target.

[Sputtering Conditions]
Pressure: 0.5 Pa
Gas: Argon; Flow rate: 20 sccm
Output: 200 W
Substrate temperature: Unheated (25° C.)

(Fabrication of Solid Electrolyte Film 43)

A commercially available lithium vanadate ($Li_3VO_4$) powder was sintered under pressure with a hot-press, and processed into a predetermined shape to fabricate a target configured from a lithium vanadate ($Li_3VO_4$) sintered body. The solid electrolyte film 43 was then fabricated on the titanium electrode film 42 using this target, under the sputtering conditions below. The solid electrolyte film 43 was formed on the titanium electrode film 42 in 1 cm×1 cm and in a thickness of 50 nm to 300 nm.

[Sputtering Conditions]
Pressure: 0.5 Pa
Gas: Argon; Flow rate: 20 sccm
Output: 50 W
Substrate temperature: Unheated (25° C.)

(Fabrication of Titanium Electrode Film 44)

The titanium electrode film 44 of titanium was formed as the upper electrode on the solid electrolyte film 43 under the following sputtering conditions, using a titanium metallic material as the target.

[Sputtering Conditions]
Pressure: 0.5 Pa
Gas: Argon; Flow rate: 20 sccm
Output: 200 W
Substrate temperature: Unheated (25° C.)

[Conductivity Measurement]

The conductivity of the solid electrolyte film 43 was measured from the measurement cell, using a complex impedance method. The conductivity was measured under the 80° C., 70° C., 60° C., 50° C., 40° C., 30° C., 20° C., 10° C., 0° C., −10° C., −20° C., and −30° C. temperature conditions.

[X-Ray Diffraction Analysis]

Only a halo peak was confirmed in the X-ray diffraction analysis of the solid electrolyte film 43. Specifically, it was confirmed that the solid electrolyte film 43 was amorphous.

Test Example 2

[Fabrication of Measurement Cell]

A measurement cell of the configuration glass substrate 41/titanium electrode film 42/solid electrolyte film 43/titanium electrode film 44 shown in FIG. 3 was fabricated in the manner described below. Note that the titanium electrode film 42, the solid electrolyte film 43, and the titanium electrode film 44 were formed using an RF magnetron sputtering apparatus.

(Fabrication of Titanium Electrode Film 42)

The titanium electrode film 42 of titanium was formed as the lower electrode on the glass substrate 41 under the following sputtering conditions, using a titanium metallic material as the target.

[Sputtering Conditions]
Pressure: 0.5 Pa
Gas: Argon; Flow rate: 20 sccm
Output: 100 W
Substrate temperature: Unheated (25° C.)

(Fabrication of Solid Electrolyte Film 43)

A commercially available lithium vanadate powder was sintered under pressure with a hot-press, and processed into a predetermined shape to fabricate a target configured as a lithium vanadate ($Li_3VO_4$) sintered body. The solid electrolyte film 43 was then fabricated on the titanium electrode film 42 using this target, under the sputtering conditions below. The solid electrolyte film 43 was formed on the titanium electrode film 42 in 1 cm×1 cm and in a thickness of 50 nm to 300 nm.

[Sputtering Conditions]
Pressure: 0.5 Pa
Gas: Argon:nitrogen=1:1 (gas flow rate ratio)
Output: 50 W
Substrate temperature: Unheated (25° C.)

(Fabrication of Titanium Electrode Film 44)

The titanium electrode film 44 of titanium was formed as the upper electrode on the solid electrolyte film 43 under the following sputtering conditions, using a titanium metallic material as the target.

[Sputtering Conditions]
Pressure: 0.5 Pa
Gas: Argon; Flow rate: 20 sccm
Output: 200 W
Substrate temperature: Unheated (25° C.)

[Conductivity Measurement]

The conductivity of the solid electrolyte film 43 was measured from the measurement cell, using a complex impedance method. The conductivity was measured under the 80° C., 70° C., 60° C., 50° C., 40° C., 30° C., 20° C., 10° C., 0° C., −10° C., −20° C., and −30° C. temperature conditions.

[X-Ray Diffraction Analysis]

Only a halo peak was confirmed in the x-ray diffraction analysis of the solid electrolyte film 43. Specifically, it was confirmed that the solid electrolyte film 43 was amorphous.

Test Example 3

[Fabrication of Measurement Cell]

A measurement cell of the configuration glass substrate 41/titanium electrode film 42/solid electrolyte film 43/titanium electrode film 44 shown in FIG. 3 was fabricated in the manner described below. Note that the titanium electrode film 42, the solid electrolyte film 43, and the titanium electrode film 44 were formed using an RF magnetron sputtering apparatus.

(Fabrication of Titanium Electrode Film 42)

The titanium electrode film 42 of titanium was formed as the lower electrode on the glass substrate 41 under the following sputtering conditions, using a titanium metallic material as the target.

[Sputtering Conditions]
Pressure: 0.5 Pa
Gas: Argon; Flow rate: 20 sccm
Output: 200 W
Substrate temperature: Unheated (25° C.)

(Fabrication of Solid Electrolyte Film 43)

A commercially available lithium vanadate powder was sintered under pressure with a hot-press, and processed into a predetermined shape to fabricate a target configured as a lithium vanadate ($Li_3VO_4$) sintered body. The solid electrolyte film 43 was then fabricated on the titanium electrode film 42 using this target, under the sputtering conditions below. The solid electrolyte film 43 was formed on the titanium electrode film 42 in 1 cm×1 cm and in a thickness of 50 nm to 300 nm.

[Sputtering Conditions]
Pressure: 0.5 Pa
Gas: Argon:nitrogen:oxygen=2:1:1 (gas flow rate ratio)
Output: 50 W
Substrate temperature: Unheated (25° C.)
(Fabrication of Titanium Electrode Film 44)

The titanium electrode film 44 of titanium was formed as the upper electrode on the solid electrolyte film 43 under the following sputtering conditions, using a titanium metallic material as the target.

[Sputtering Conditions]
Pressure: 0.5 Pa
Gas: Argon; Flow rate: 20 sccm
Output: 200 W
Substrate temperature: Unheated (25° C.)
[Conductivity Measurement]

The conductivity of the solid electrolyte film 43 was measured from the measurement cell, using a complex impedance method. The conductivity was measured under the 80° C., 70° C., 60° C., 50° C., 40° C., 30° C., 20° C., 10° C., 0° C., −10° C., −20° C., and −30° C. temperature conditions.

[X-Ray Diffraction Analysis]

Only a halo peak was confirmed in the x-ray diffraction analysis of the solid electrolyte film 43. Specifically, it was confirmed that the solid electrolyte film 43 was amorphous.

Test Example 4

[Fabrication of Measurement Cell]

A measurement cell of the configuration glass substrate 41/titanium electrode film 42/solid electrolyte film 43/titanium electrode film 44 shown in FIG. 3 was fabricated in the manner described below. Note that the titanium electrode film 42, the solid electrolyte film 43, and the titanium electrode film 44 were formed using an RF magnetron sputtering apparatus.

(Fabrication of Titanium Electrode Film 42)

The titanium electrode film 42 of titanium was formed as the lower electrode on the glass substrate 41 under the following sputtering conditions, using a titanium metallic material as the target.

[Sputtering Conditions]
Pressure: 0.5 Pa
Gas: Argon; Flow rate: 20 sccm
Output: 200 W
Substrate temperature: Unheated (25° C.)
(Fabrication of Solid Electrolyte Film 43)

A commercially available lithium vanadate powder was sintered under pressure with a hot-press, and processed into a predetermined shape to fabricate a target configured as a lithium vanadate ($Li_3VO_4$) sintered body. The solid electrolyte film 43 was then fabricated on the titanium electrode film 42 using this target, under the sputtering conditions below. The solid electrolyte film 43 was fabricated on the titanium electrode film 42 in 1 cm×1 cm and in a thickness of 50 nm to 300 nm.

[Sputtering Conditions]
Pressure: 0.5 Pa
Gas: Argon:oxygen=1:1 (gas flow rate ratio)
Output: 50 W
Substrate temperature: Unheated (25° C.)
(Fabrication of Titanium Electrode Film 44)

The titanium electrode film 44 of titanium was formed as the upper electrode on the solid electrolyte film 43 under the following sputtering conditions, using a titanium metallic material as the target.

[Sputtering Conditions]
Pressure: 0.5 Pa
Gas: Argon; Flow rate: 20 sccm
Output: 200 W
Substrate temperature: Unheated (25° C.)
[Conductivity Measurement]

The conductivity of the solid electrolyte film 43 was measured from the measurement cell, using a complex impedance method. The conductivity was measured under the 80° C., 70° C., 60° C., 50° C., 40° C., 30° C., 20° C., 10° C., 0° C., −10° C., −20° C., and −30° C. temperature conditions.

[X-Ray Diffraction Analysis]

Only a halo peak was confirmed in the X-ray diffraction analysis of the solid electrolyte film 43. Specifically, it was confirmed that the solid electrolyte film 43 was amorphous.

Test Example 5

(For Comparison)
[Fabrication of Measurement Cell]

The lithium vanadate ($Li_3VO_4$) sintered body used as the target in Test Example 1 was processed into a predetermined shape, and sandwiched between a pair of titanium plates to fabricate a measurement cell.

[Conductivity Measurement]

The conductivity of the lithium vanadate ($Li_3VO_4$) sintered body was measured from the measurement cell, using a complex impedance method. The conductivity was measured at room temperature (20° C.). The measured conductivity was about $10^{-8}$ to $10^{-9}$ at room temperature (20° C.).

<Evaluation>

Figure 4:
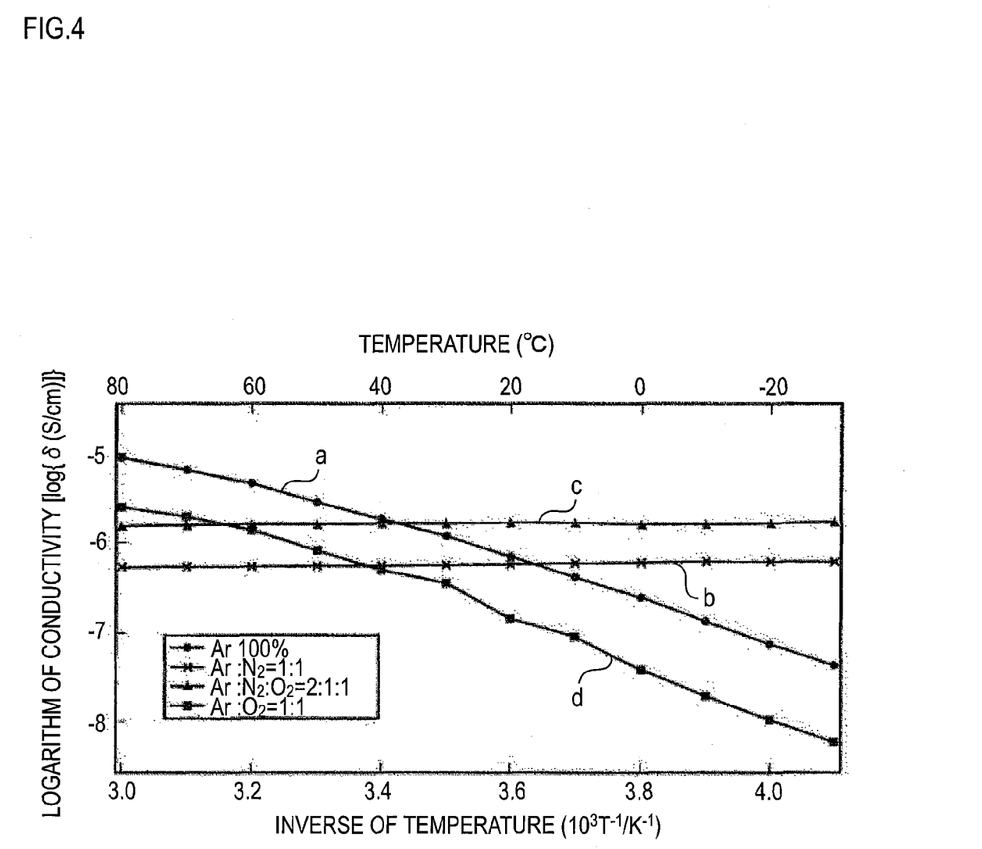
FIG. 4 is a graph representing the measurement results of Test Examples.

The measured conductivities of Test Examples 1 to 4 were plotted in a graph by plotting the inverse of temperature on the horizontal axis against the logarithm of conductivity on the vertical axis. FIG. 4 represents the graph. In FIG. 4, line a represents the measurement result of Test Example 1, line b the measurement result of Test Example 2, line c the measurement result of Test Example 3, and line d the measurement result of Test Example 4.

The measured data (changes in conductivity with temperature) were processed using commercially available software, and the activation energy was calculated from the measured data. Table 1 presents the calculated values of activation energy.

TABLE 1

| | Sputtering gas (gas flow rate ratio) | Activation energy (eV) |
|---|---|---|
| Test Example 1 | Ar (100%) | 0.16 |
| Test Example 2 | $Ar:N_2 = 1:1$ | $-5.01 \times 10^{-3}$ |
| Test Example 3 | $Ar:N_2:O_2 = 2:1:1$ | $-3.52 \times 10^{-3}$ |
| Test Example 4 | $Ar:O_2 = 1:1$ | 0.18 |

In FIG. 4, the solid electrolyte layers fabricated in Test Examples 1 to 4 had conductivities of about $10^{-7}$ to $10^{-5.5}$ at room temperature (20° C.), as indicated by lines a, b, c, and d. The conductivity of the sintered body fabricated in Test Example 5 was $10^{-9}$ to $10^{-8}$ at room temperature (20° C.). Specifically, the conductivities of the solid electrolyte films fabricated in Test Examples 1 to 4 improved by a factor of about 10 to 100 over the sintered body fabricated in Test Example 5.

Further, as shown in Table 1 and in FIG. 4, the solid electrolyte film formed in an argon (Ar)- and nitrogen ($N_2$)-containing atmosphere in Test Example 2 had lower activation energy, and the conductivity was stable over a wide temperature range. Further, as shown in Table 1 and in FIG. 4, the solid electrolyte film formed in an argon (Ar)-, nitrogen ($N_2$)-, and oxygen ($O_2$)-containing atmosphere in Test Example 3 had lower activation energy, and the conductivity was stable over a wide temperature range.

Note that even though Test Examples 1 to 4 are based on the solid electrolyte film formed from the lithium vanadate sintered body, the solid electrolyte film formed from a $Li_3NbO_4$, $Li_3TaO_4$, or $Li_3DbO_4$ sintered body tends to produce the same results. Specifically, V, Nb, Ta, and Db are homologous elements, and the compounds of the formulae $Li_3VO_4$, $Li_3NbO_4$, $Li_3TaO_4$, and $Li_3DbO_4$ are believed to have common and/or similar effects, so long as the effects of the present application are concerned.

Further, even though Test Examples 1 to 4 were described based on the thin films formed by RF sputtering, thin films formed by other thin film forming methods tend to produce the same results. Specifically, the same test results are likely to be obtained even when the thin films are formed by methods other than RF sputtering, including other sputtering methods, CVD, vacuum vapor deposition, electron beam vapor deposition, laser abrasion, and a sol-gel method.

3. Other Embodiments (Variations)

The invention is not restricted by the foregoing embodiments of the invention, and various modifications and applications are possible within the scope of the invention.

For example, the structure of the solid electrolyte battery is not limited to the one described above. For example, the invention is also applicable to a solid electrolyte battery of a structure in which the positive electrode collector is omitted with the use of a conductive material for the substrate. Further, for example, the positive electrode collector layer may be configured from a metal plate of positive electrode collector material. The negative electrode collector layer may be configured from a metal plate of negative electrode collector material. Further, the invention is not limited to secondary batteries, and is also applicable to primary batteries.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A solid electrolyte battery comprising:
a positive electrode layer and a negative electrode layer; and
a solid electrolyte layer contacting both the positive electrode layer and the negative electrode layer, the solid electrolyte layer being a single layer formed of a compound of the formula $Li_3MO_4$, wherein M is selected from the group consisting of Nb, Ta, and Db, and the single layer being at least partially in an amorphous phase.

2. The solid electrolyte battery of claim 1, wherein the single layer is an amorphous single phase.

3. A solid electrolyte battery comprising:
a positive electrode layer and a negative electrode layer; and
a solid electrolyte layer contacting both the positive electrode layer and the negative electrode layer, the solid electrolyte layer being a nitrogen-containing single layer that includes nitrogen added to a compound of the formula $Li_3MO_4$, wherein M is selected from the group consisting of Nb, Ta, or Db, and the nitrogen-containing single layer being at least partially in an amorphous phase.

4. The solid electrolyte battery of claim 3, wherein the nitrogen-containing single layer is an amorphous single phase.

* * * * *